April 16, 1968 R. E. VON OTTO 3,378,198
TEMPERATURE CONTROLLED AIR MIXER
Filed May 23, 1967 2 Sheets-Sheet 1
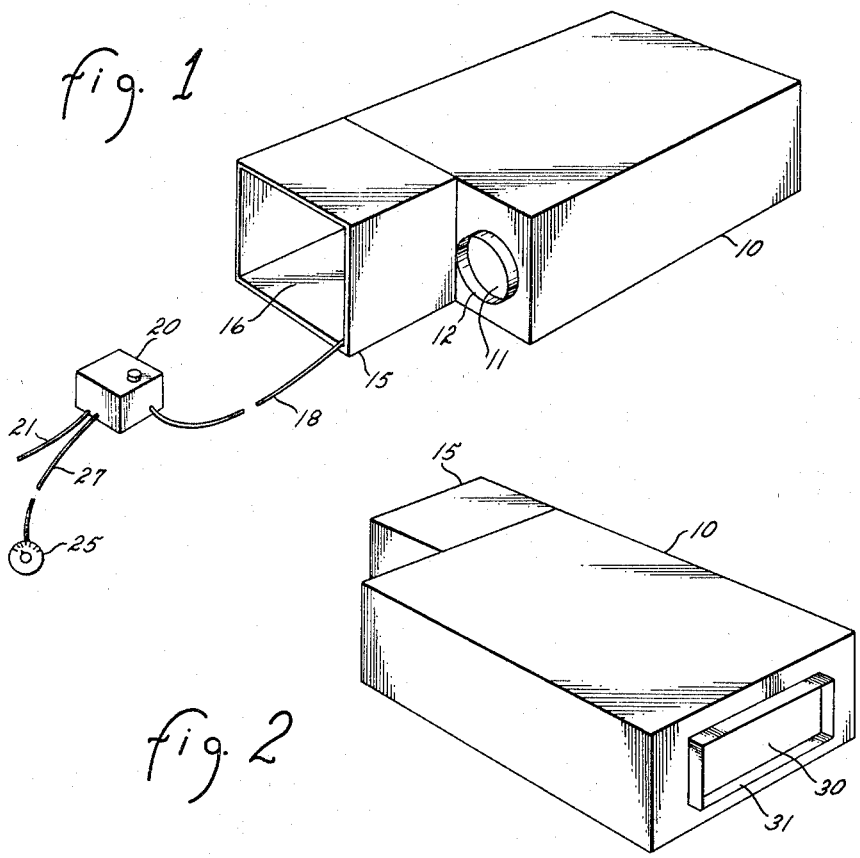
fig. 1
fig. 2
fig. 3
*INVENTOR.*
ROBERT E. VON OTTO
BY
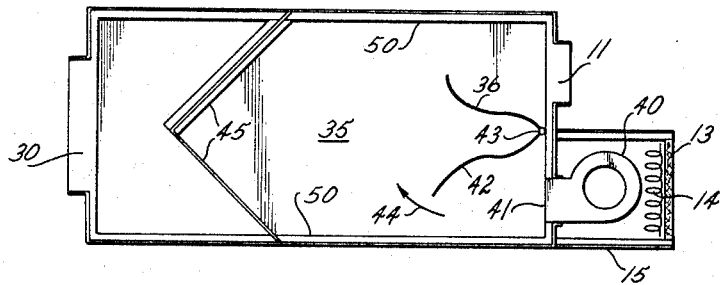
ATTORNEYS April 16, 1968    R. E. VON OTTO    3,378,198
TEMPERATURE CONTROLLED AIR MIXER
Filed May 23, 1967    2 Sheets-Sheet 2

INVENTOR.
ROBERT E. VON OTTO
BY
Drummond & Cahill
ATTORNEYS

United States Patent Office 3,378,198
Patented Apr. 16, 1968

3,378,198
TEMPERATURE CONTROLLED AIR MIXER
Robert E. Von Otto, Washington, D.C., assignor to Krueger Manufacturing Company, Inc., Tucson, Ariz.
Filed May 23, 1967, Ser. No. 640,631
6 Claims. (Cl. 236—13)

ABSTRACT OF THE DISCLOSURE

An air conditioning system utilizing a variable speed blower responsive to room temperature for automatically proportioning primary and secondary air.

Background of the invention

Air conditioning systems for providing air to rooms occupied by humans and/or business machines will normally require a predetermined minimum volume of fresh air per unit of time. The fresh air may be heated or cooled and the moisture content thereof may also be altered to provide a healthful and comfortable room condition. The design of such systems may become quite complicated and, for an ideal system operating on known parameters, can be quite expensive. Economics of operation may be effected by utilizing a proportioned amount of recirculated or secondary air; however, the recirculated air will necessarily affect the requirements of the primary air system. Further, the mixing of the recirculated or secondary air with the primary air must be thorough to prevent unwanted severe temperature gradients or induced variations in the design parameters of the air conditioning system.

Increased operating efficiencies can be obtained by using the air heated by ceiling-mounted lighting fixtures, human occupants, business machines, and other heat-producing equipment as the secondary air; for example, this air may conveniently be vented to an air space above a false ceiling and may subsequently be drawn from this space into the primary air channels, mixed, and delivered to the room. The increase in operating efficiency provided by the reuse of such air gives rise to additional cost and complicated factors in the design and construction of an air conditioning system. It has been proposed in the prior art to utilize primary air ducted into a mixing chamber and therein mixing it with secondary air aspirated into the mixing chamber by the primary air. The variations in temperature caused by the several parameters concomitant with air conditioning design result in the requirement to vary the primary/secondary air ratio. To effect this variation, the prior art has attempted to rely on damper arrangements; however, the necessity of supplying a constant volume/rate of air to the room causes prior art systems to rely on directly varying primary air.

It is therefore an object of the present invention to provide an air conditioning system for continuously varying primary/secondary air ratios.

It is another object of the present invention to provide an air conditioning system utilizing a unique primary/secondary air mixing arrangement for maintaining room air temperature at a predetermined level.

It is a further object of the present invention to provide an air conditioning system wherein a temperature sensing element may be utilized to directly control the admission of secondary air into a room and wherein the secondary air directly controls the admission of primary air into the room.

It is still another object of the present invention to provide an air conditioning system wherein a variable rate of primary air will be admitted to a mixing box and a variable rate of secondary air will be admitted to the mixing box, the ratio of primary to secondary air varying in accordance with the temperature needs of the room as dictated by a temperature-sensing device, and wherein the total delivered volume of air remains constant.

These and other advantages of the present invention will become apparent to those skilled in the art as the description thereof proceeds.

Summary of the invention

Briefly, in accordance with the preferred embodiment of the present invention, primary air at a customarily low pressure is admitted to a mixing box, the outlet of which is connected to an air inlet such as a diffuser positioned in a room to be air conditioned. The temperature, moisture content and purity of the air will be predetermined in accordance with the requirements of the room to be air conditioned; a damper is provided at the input of the primary air to the mixing box and is limited in the effect that it may have on the primary air to insure that a minimum volume of primary air per unit of time will be admitted to the mixing box. A blower driven by a variable speed electric motor is connected to the mixing box and provides secondary air for mixture with the primary air in the box. The blower and motor, in the embodiment chosen for illustration, is mounted externally of the box so that the blower outlet empties into the box and the blower inlet is positioned within an air space receiving secondary air such as, for example, a false ceiling or simply any area in which secondary air is present (e.g., the room that is to be conditioned). The damper controlling the admission of primary air to the mixing box also includes an extension integral therewith extending into the secondary air flow as the latter enters the mixing box. The electrical motor is actuated by a suitable control receiving an input signal from a room temperature sensing element.

A temperature causing the sensing element to energize the electrical motor will cause the latter to vary the rate of secondary air being admitted to the mixing box. The variation in the rate of secondary air will vary the position of the damper in the primary air inlet, thus causing an inverse change in the rate of primary air and causing the primary and secondary air ratio to vary directly with temperature. The primary and secondary air are subsequently mixed with the aid of baffles in the mixing box and are provided to the mixing box outlet for delivery to the room.

Brief description of the drawings

The present invention may more readily be described by reference to the accompanying drawings in which:

FIGURE 1 is a perspective view of the apparatus used in an air conditioning system constructed in accordance with the teachings of the present invention.

FIGURE 2 is a perspective view of the apparatus of FIGURE 1 showing the mixing box outlet thereof.

FIGURE 3 is a top view of the apparatus of FIGURE 1 with the top cover plate removed to reveal the mechanism therein.

Detailed description of the drawings

Figure 4:
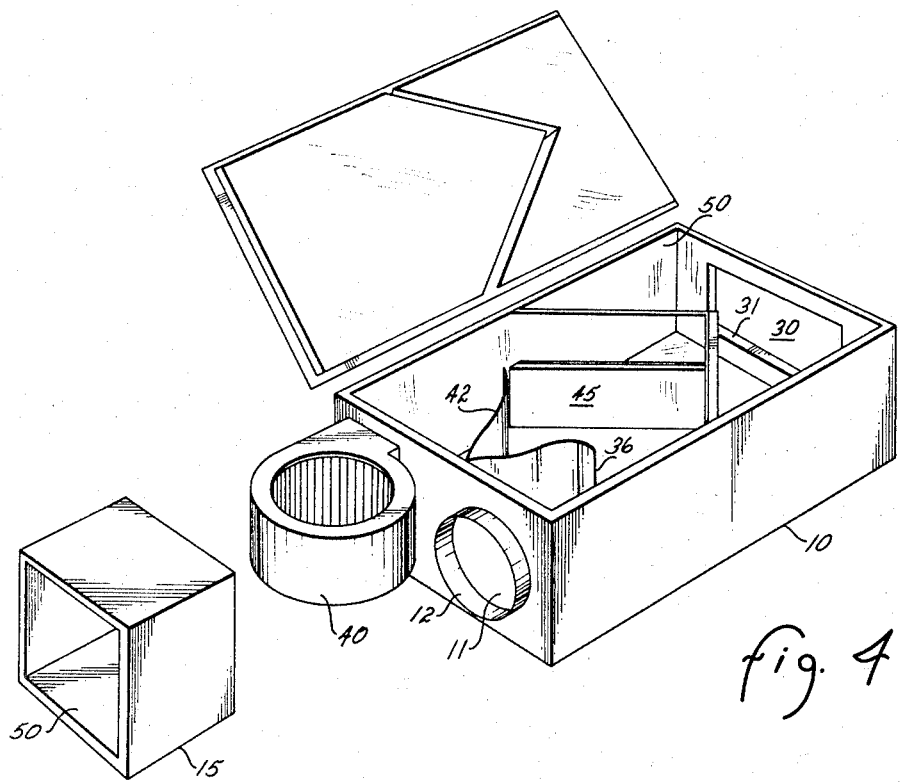
FIGURE 4 is a perspective view of the apparatus of FIGURE 1 shown partially exploded to illustrate the interrelationship of the parts thereof.

Referring now to FIGURES 1 and 2, a mixing box 10 is provided with an opening 11 to admit primary air. The primary air may be ducted to the opening 11 in any conventional and well known manner, a collar 12 being provided for attachment of the primary air duct. A housing 15 is provided to accommodate a secondary air blower and electrical motor therefor. The housing 15 may contain a filter 13 (FIG. 3) to filter the secondary air and may contain a heating coil (schematically shown in FIG. 3 at 14) to heat the secondary air if required. The requirement for energizing the heating coil may be determined by the same temperature sensing element utilized to actuate the blower motor to be described hereinafter. The secondary air may be provided to the housing 15 at the open end 16 thereof by placing the mixing box 10 in an environment such as an air space containing the secondary air; alternately, the secondary air may be provided to the housing 15 by suitable ducting. The electric motor driving the secondary air blower is provided with electric power through conductors 18. The voltage or current (depending on the type of motor control used) on the conductors 18 is varied by a motor control schematically shown in FIGURE 1 at 20. The control 20 is connected to a suitable source of electric power such as a conventional 115 volt, 60-cycle, AC source (not shown) via conductors 21. A temperature-sensing element 25 which may be of any conventional design, provides an electric signal to the control 20 through conductors 27. The device 25 may be of a commercially available type; the control 20 may be selected from a variety of motor controls presently on the market, one of which is characterized by the use of silicon controlled rectifiers (SCR) for the utilization of a control signal from the temperature-sensitive device 25. The control will normally utilize the control signal derived from a temperature-sensing device for varying the power provided at the output thereof through the switching of SCR's, causing phase modulation and ultimately resulting in variations in motor speed corresponding to variations in sensed temperature.

The mixing box is also provided with an outlet 30 having a flange 31 for connection to appropriate duct work, or in some instances, for connection directly to an output air register or diffuser.

Referring now to FIGURES 3 and 4, the primary air inlet 11 may be seen emptying into a chamber 35; air passing through the inlet 11 encounters a damper blade 36 before entering the chamber 35. It will be obvious that the position of the damper blade 36 will vary the rate of admission of primary air into the chamber 35. A blower and motor combination 40 is mounted in the enclosure 15 and delivers secondary air to a secondary air inlet 41. Secondary air entering through the inlet 41 impinges upon damper blade 42 before entering the chamber 35. The position of the damper blade 42 will determine the position of the damper blade 36. Since the blade 42 is used to control the positioning of the balde 36, the damper blade 42 may also be called a sensing damper blade. The control of blade 36 is accomplished by forming both blades 36 and 42 from a single sheet of metal and hinging the metal for pivotal movement about a hinge pin 43. When the blower is shut off, the damper blade 42 will pivot opposite to the direction indicated by the arrow 44 and will be used as a damper to prevent the flow of primary air through the secondary air inlet 41. It will be obvious to those skilled in the art that various modifications may be made in the damper blade construction and that the blades may actually be constructed of separate sheets and interconnected to hinge about a common axis.

The primary air entering the inlet 11 and the secondary air entering the inlet 41 pass the respective damper blades into chamber 35 and subsequently pass over and through baffles 45 intended to insure thorough mixing of the primary/secondary air. The mixed air subsequently exits through the outlet 30 into the previously mentioned duct or diffuser. The mixing box 10 and the enclosure 15 are provided with thermo and acoustical lining 50.

Figure 5:
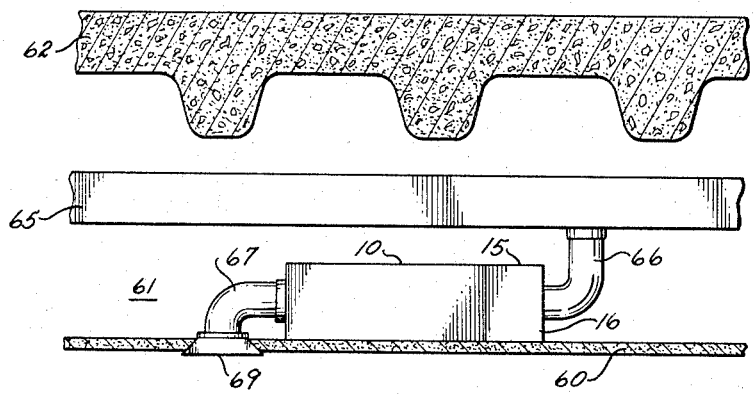
FIGURE 5 is an illustration schematically showing an air conditioning system constructed in accordance with the teachings of the present invention.

Referring now to FIGURE 5, the mixing box 10 is shown mounted above a suspended ceiling 60. The space 61 between the suspended ceiling and the concrete floor 62 of the roof or next higher floor may be used as a large plenum into which secondary air is admitted, such as by venting through the suspended ceiling. The secondary air is admitted to the mixing box 10 through the opening 16 in the enclosure 15 as described previously in connection with FIGURES 1 through 4. Primary air is provided through a main duct 65 and branch duct 66. Primary/secondary air exits from the mixing box 10 through duct 67 and through an air diffuser 69.

The operation of the system of the present invention may now be described. Assuming that secondary air at higher than room temperature, such as air heated by lighting fixtures, business machines, humans, electrical appliances, and other heat producing appliances, is delivered to an air space from which the induced air is drawn, secondary air is forced into the mixing box 10 through opening 16 and secondary air inlet 41. Primary air is delivered to the mixing box from ducts; the primary and secondary air is mixed in the mixing box and delivered through the air diffuser 69 into the room. If the room temperature-sensing device indicates that the room temperature should be increased, the signal derived from the device and applied to the motor control 20 results in the application of electric power to the variable speed electric motor. The speed of the motor will be proportional to the signal derived from the temperature-sensing device. When power is supplied to the electric motor, the blower will force secondary air into the mixing box 10 against sensing damper blade 42. The damper blade 42 will be forced in a direction indicated in FIGURE 3 by the arrow 44 which, in turn, will force the damper blade 36 to swing about the pivotal axis 43 to impede the flow of primary air through the primary air inlet 11. The rate of mixed air derived from the mixing box will remain constant but the primary/secondary air ratio will vary in accordance with the positioning of the damper blades 42 and 36. If further heating is required as dictated by the temperature-sensing device, the heating coil 14 may be energized to supplement the available heat being delivered to the room by reheating the secondary air prior to mixing with the primary air. As the room temperature approaches the temperature-sensing device setting, the signal derived from the device will decrease in magnitude, resulting in decreased power application from the motor control to the motor. The decreased power to the motor causes the blower to slow, resulting in decreased secondary air admittance to the mixing box 10. The decreased air impinging on sensing damper blade 42 causes the damper blades 36 and 42 to seek a new position wherein the force exerted on the two blades by the primary and secondary air balance each other and the blades are positionally stabilized. It will be apparent that blade 42 will move in a direction opposite to that indicated by arrow 44 in FIGURE 3 and that the blade 36 will admit a greater rate of primary air into the mixing box 10. As the motor slows, the damper blade 42 closes the secondary air inlet to prevent primary air from backing through the blower. The overall result of the utilization of the combination of temperature-sensing device, motor control, variable speed electric motor-blower, and mutually acting damper blades is the adjustment of the primary/scecondary air ratio in correspondence with the requirements dictated by the preset room temperature-sensing device setting while nevertheless maintaining a constant total air volume/rate delivered to the room.

The present invention has been described in terms of a specific embodiment; it will be apparent to those skilled in the art that many modifications may be made to accommodate a variety of applications of the invention. It is therefore intended that the present invention be limited only by the scope of the claims appended hereto.

I claim:

1. An air conditioning system comprising: a mixing box having a primary air inlet, a secondary air inlet, and an outlet; a variable speed motor connected to a blower for delivering secondary air from a secondary air supply to the secondary air inlet of said mixing box; a first damper blade for controlling the amount of primary air admitted to said box; a second damper blade connected to said first damper blade and responsive to the amount of secondary air entering said box to control the positioning of said first damper blade; means responsive to the temperature at a preselected location for controlling the speed of said variable speed motor.

2. The combination set forth in claim 1 wherein said second damper blade is controlled by said first damper blade to cover said secondary air inlet when no secondary air is delivered by said blower.

3. The combination set forth in claim 1 wherein said first and second damper blades are pivoted about a common axis.

4. The combination set forth in claim 1 wherein said mixing box includes mixing baffles to insure complete mixing of primary and secondary air.

5. The combination set forth in claim 1 wherein said means comprises a temperature sensitive device for producing an electrical signal proportional to temperature deviation from a preselected value and wherein said electrical signal is received by a motor control, said motor control supplying electrical power to said variable speed motor in proportion to said electrical signal to thereby vary the motor speed.

6. The combination set forth in claim 1 wherein said secondary air supply comprises air in an enclosure to be air conditioned.

References Cited

UNITED STATES PATENTS

| 2,971,449 | 2/1961 | Huckleberry | 98—38 |
| 3,116,016 | 12/1963 | Joesting | 236—13 |
| 3,318,225 | 5/1967 | May | 236—13 X |

ROBERT A. O'LEARY, *Primary Examiner.*

W. E. WAYNER, *Assistant Examiner.*